United States Patent
Duggan

Patent Number: 5,902,048
Date of Patent: May 11, 1999

[54] CENTER BEARING ASSEMBLY HAVING SHEAR PLATE

[75] Inventor: James A. Duggan, Temperance, Mich.

[73] Assignee: Dana Corporation, Toledo, Ohio

[21] Appl. No.: 08/994,613

[22] Filed: Dec. 19, 1997

[51] Int. Cl.$^6$ .................................................. F16C 19/00
[52] U.S. Cl. ........................... 384/99; 384/535; 384/446
[58] Field of Search ............................. 384/99, 535, 581, 384/215, 202, 446

[56] References Cited

U.S. PATENT DOCUMENTS

| | | |
|---|---|---|
| 2,557,140 | 6/1951 | Razdowitz . |
| 2,635,483 | 4/1953 | Welsh . |
| 2,673,631 | 3/1954 | Gold . |
| 2,732,921 | 1/1956 | Rabinow . |
| 2,809,733 | 10/1957 | Perry . |
| 2,987,153 | 6/1961 | Perry . |
| 3,144,921 | 8/1964 | Martinek . |
| 3,538,469 | 11/1970 | Litte et al. . |
| 4,200,003 | 4/1980 | Miller . |
| 4,392,694 | 7/1983 | Reynolds . |
| 4,772,407 | 9/1988 | Carlson . |
| 4,782,927 | 11/1988 | Sproston et al. . |
| 4,849,120 | 7/1989 | Price et al. . |
| 4,867,655 | 9/1989 | Barbic et al. . |
| 4,896,754 | 1/1990 | Carlson et al. . |
| 4,921,229 | 5/1990 | Hori . |
| 5,007,303 | 4/1991 | Okuzumi . |
| 5,054,593 | 10/1991 | Carlson . |
| 5,090,531 | 2/1992 | Carlson . |
| 5,236,182 | 8/1993 | Aoki et al. . |
| 5,322,484 | 6/1994 | Reuter . |
| 5,380,100 | 1/1995 | Yu . |
| 5,452,957 | 9/1995 | Duggan . |
| 5,730,531 | 3/1998 | Pinkos et al. ............................. 364/544 |

FOREIGN PATENT DOCUMENTS

| | | |
|---|---|---|
| 342882 | 11/1989 | European Pat. Off. . |
| 3908965 | 9/1990 | Germany . |

OTHER PUBLICATIONS

Designfax magazine, p. 33, Sep., 1988.
Machine Design magazine, pp. 42–45, Jan., 1988.
American Cyanamid brochure, undated.
SAE Technical Paper 930268, pp. 88–93, Mar., 1993.

Primary Examiner—Lenard A. Footland
Attorney, Agent, or Firm—MacMillan, Sobanski & Todd, LLC

[57] ABSTRACT

A center bearing assembly adapted to rotatably support a rotatable shaft on a vehicle frame includes an annular roller bearing that is adapted to receive and rotatably support the rotatable shaft, a support member for supporting the roller bearing, and a bracket for securing the roller bearing and the support member on the vehicle frame. The support member includes a reservoir containing a Theological fluid. A rheological fluid is any fluid that exhibits a significant change in its ability to flow or shear upon the application of an appropriate energy field, such as electrical or magnetic fields. A shear plate secured to the roller bearing includes a portion extending into the reservoir so that axial movement of the shaft with respect to the support member is permitted. The novel construction of this invention includes an effective center bearing assembly support member having variable vibration dampening characteristics which can also accommodate axial movement of the rotatable shaft.

19 Claims, 3 Drawing Sheets

CENTER BEARING ASSEMBLY HAVING SHEAR PLATE

BACKGROUND OF THE INVENTION

The invention relates in general to bearings for supporting shafts for rotation and in particular to an improved structure for a center bearing assembly for rotatably supporting an intermediate portion of a vehicle drive line or coupling shaft assembly.

In most rear wheel drive vehicles, a source of rotational energy, such as an internal combustion or diesel engine, is located near the front of the vehicle. The engine is connected by means of a drive line to rotate one or more driven wheels located near the rear of the vehicle. The drive line typically extends between a transmission, which is connected to the engine, and a differential, which is connected to the driven wheels. In some vehicles, the distance separating the transmission and the differential is relatively short. In these vehicles, the drive line is composed of a single tube, usually referred to as the drive shaft. In other vehicles, the distance separating the transmission and the differential is relatively long, making the use of a single drive shaft impractical. In these vehicles, the drive line is composed of a drive shaft and one or more coupling shafts. The coupling shafts are connected to the drive shaft (and to each other) by universal joints.

Drive lines that are composed of a drive shaft and one or more coupling shafts require the use of one or more intermediate resilient support structures, which are generally referred to as center bearing assemblies or shaft support bearing assemblies. A typical center bearing assembly includes an annular roller bearing within which the coupling shaft is rotatably supported. The roller bearing itself is disposed within a generally annular resilient support member. The resilient support member is, in turn, disposed within a relatively rigid, generally U-shaped bracket which is secured to a cross member extending between the side rails of the vehicle frame.

The resilient support member is provided to reduce vibrations of the drive line in the vicinity of the center bearing assembly and to prevent such vibrations from being transmitted to the vehicle frame. In the past, the resilient support member has been formed from an elastomeric material, such as rubber. Under most vehicle operating conditions, known rubber support members are effective in substantially reducing the transmission of vibrations from the drive line to the vehicle frame. However, the vibration dampening characteristics of such known support members, which depend upon the specific material and the particular configuration thereof, remain constant regardless of the vehicle operating conditions. Accordingly, the vibration dampening characteristics of known support members can be optimized only for a single set of operating conditions. The vibrations generated by the drive line, on the other hand, constantly change with changes in the operating conditions of the vehicle. As a result, these support members may not provide optimum vibration dampening of vibrations under varying operating conditions. Vibrations generated by the vehicle and drive line also result in axial and radial movement of the roller bearing which receives the coupling shaft. In particular, the roller bearing is exposed to axial and radial movements transmitted from the coupling shaft. Such movements can be particularly objectionable during start up of a drive line.

It is desirable to provide an improved structure for a center bearing assembly which includes a support member having vibration dampening characteristics which can be adjusted in accordance with the changing operating conditions of the vehicle. Furthermore, it is desirable to provide an improved structure for a center bearing assembly which can accommodate axial and radial movements of the roller bearing during operation of the vehicle.

SUMMARY OF THE INVENTION

The invention relates to a center bearing assembly adapted to rotatably support a rotatable shaft on a vehicle frame. The center bearing assembly includes an annular roller bearing that is adapted to receive and rotatably support the rotatable shaft, a support member for supporting the roller bearing, and a bracket for securing the roller bearing and the support member on the vehicle frame. The support member includes a reservoir containing a rheological fluid. A rheological fluid is any fluid that exhibits a significant change in its ability to flow or shear upon the application of an appropriate energy field, such as electrical or magnetic fields. A shear plate secured to the roller bearing includes a portion extending into the reservoir so that axial movement of the shaft with respect to the support member is permitted. The novel construction of this invention includes an effective center bearing assembly support member having variable vibration dampening characteristics which can also accommodate axial movement of the rotatable shaft.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
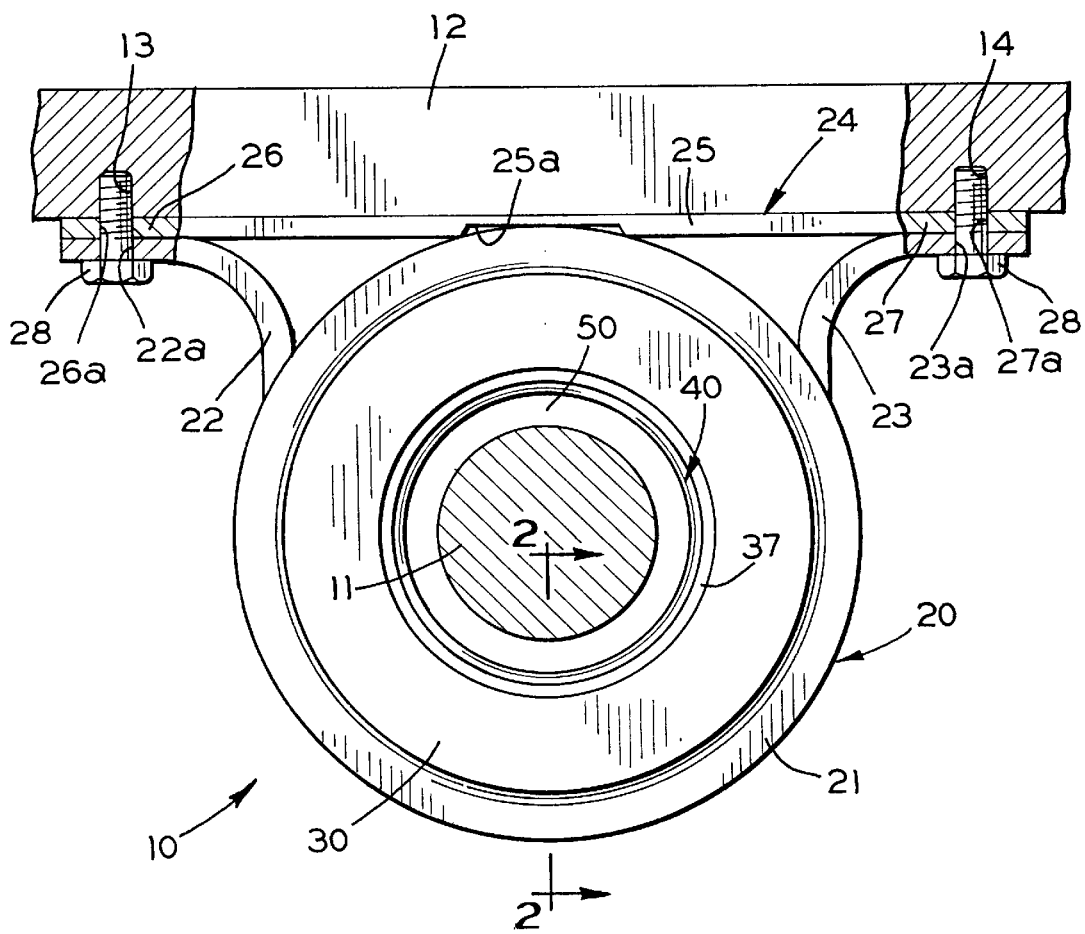
FIG. 1 is a front elevational view, partially in cross section, of a first embodiment of a center bearing assembly in accordance with this invention mounted on a cross member of a vehicular frame.
Figure 2:
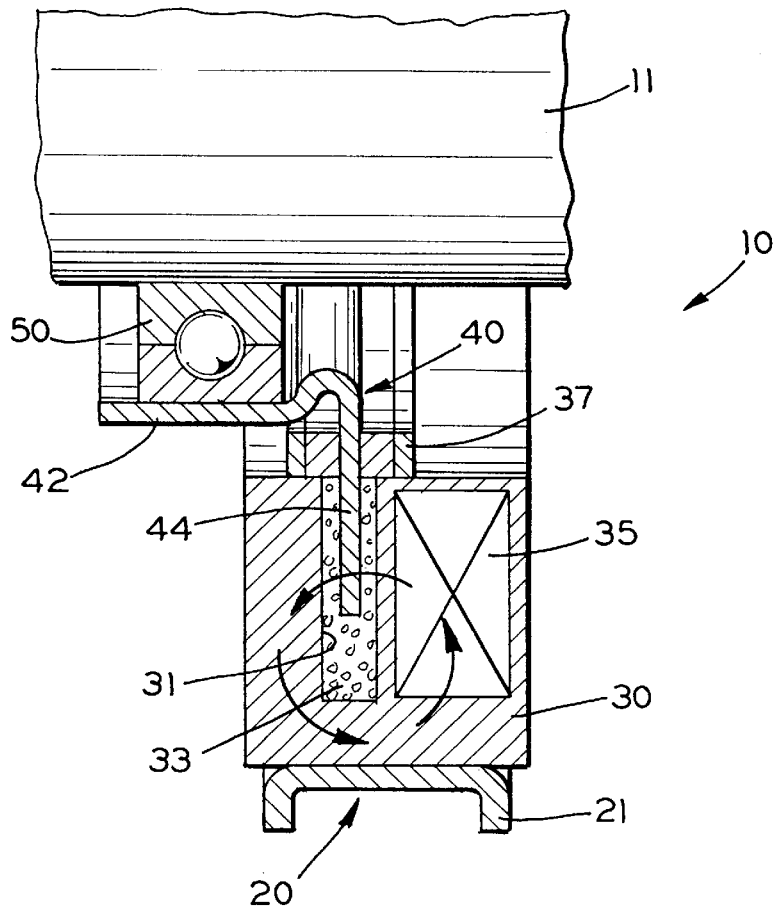
FIG. 2 is an enlarged sectional elevational view of a portion of the first embodiment of the center bearing assembly taken along line 2—2 of FIG. 1.

A center bearing assembly in accordance with this invention is indicated generally at 10 in FIGS. 1 and 2. As is well known in the art, the center bearing assembly 10, also commonly referred to as a shaft support bearing assembly, is adapted to rotatably support a shaft 11 or similar component of a multiple piece vehicle drive line on a cross member 12 or other portion of a frame for a vehicle. The cross member 12 includes a pair of threaded apertures 13 and 14 for securing the center bearing assembly 10 thereto, in a manner which will be described in detail below. The general structure and operation of the center bearing assembly 10 is well known in the art and is not discussed in detail herein. U.S. Pat. No. 4,392,694 to Reynolds, assigned to the assignee of this invention, discloses the general structure and operation of center bearing assemblies, and the disclosure of that patent is incorporated herein by reference.

The center bearing assembly 10 includes a bracket indicated generally at 20. The bracket 20 includes a generally annular body portion 21 and a pair of opposed, outwardly extending leg portions 22 and 23. As shown in FIG. 2, the body portion 21 of the bracket 20 is preferably formed having a substantially U-shaped cross sectional shape for providing strength thereto. The leg portions 22 and 23 may be formed integrally with the body portion 21 as shown, or alternatively may be secured to the body portion 21 by welding or any other suitable method. Respective apertures 22a and 23a are formed through ends of the leg portions 22 and 23. The apertures 22a and 23a are spaced apart from one another by the same distance as the apertures 13 and 14 formed in the cross member 12. Thus, as will be explained in detail below, the apertures 22a and 23a can be aligned with the apertures 13 and 14 to permit the bracket 20 to be secured to the cross member 12 of the vehicular frame.

A reinforcing bar, indicated generally at 24, may be disposed between the bracket 20 and the cross member 12. The illustrated reinforcing bar 24 includes a central body portion 25 and a pair of end portions 26 and 27. The central body portion 25 is formed having a recess 25a, within which a portion of the annular body portion 21 of the bracket 20 extends. Respective apertures 26a and 27a are formed through the end portions 26 and 27 of the reinforcing bar 25. The apertures 26a and 27a are spaced apart from one another by the same distance as the apertures 13 and 14 formed in the cross member 12. Thus, apertures 26a and 27a can be aligned with apertures 22a and 23a and apertures 13 and 14 to permit the bracket 20 to be secured to the cross member 12 of the vehicle frame by suitable threaded fasteners 28. The threaded fasteners 28 extend through aligned apertures 22a, 26a, and 13 and through aligned apertures 23a, 27a, and 14 to secure the bracket 20 and reinforcing bar 24 to the cross member 12.

The center bearing assembly 10 includes a support member 30 that is generally annular in shape and has an outer circumferential surface which abuts an inner circumferential surface of the body portion 21 of the bracket 20. As shown in FIG. 2, an annular cavity or reservoir 31 is defined within the support member 30. The reservoir 31 is filled with a rheological fluid 33. As used herein, the term rheological fluid refers to a fluid that exhibits a significant change in its ability to flow or shear upon the application of an appropriate energy field. In the preferred embodiment, the rheological fluid is a magneto-rheological (MR) fluid, which is responsive to the presence of a magnetic field for changing its ability to flow or shear. MR fluids are formed of magnetizable particles, such as carbonyl iron, in a fluid carrier, such as a silicone oil. When exposed to a magnetic field, the particles align and reduce the ability of the fluid to flow. The shear resistance of the MR fluid is a function of the magnitude of the applied magnetic field. MR fluids are preferred for use in this invention because they are capable of generating relatively high fluid shear stresses and can be controlled using power supplies which are normally available in vehicles. TRW MR fluid, which is commercially available from TRW, Inc., is an example of one known rheological fluid which has been found suitable for use in this invention. However, other rheological fluids can also be used in accordance with this invention. For example, electro-rheological (ER) fluids, which are responsive to the presence of electrical energy (such as voltage or current) may also be used.

Means are provided for selectively generating and applying an energy field to the rheological fluid 33. The specific nature of this means will depend upon the particular type of rheological fluid 33 is selected for use. In the preferred embodiment, where the rheological fluid 33 is an MR fluid, the means for selectively generating an energy field can include one or more electromagnetic coils 35 provided within the support member 30 adjacent to the reservoir 31 containing the MR fluid 33. The electromagnetic coils 35 may be arranged in any manner such that when energized, a magnetic field is applied to the MR fluid 33. The electromagnetic coils 35 are preferably arranged so that the applied magnetic field is generally uniform throughout the reservoir 31 containing the MR fluid 33. The electromagnetic coils 35 are preferably circumferentially embedded in or otherwise supported on the support member 30. The coils 35 are connected to a power supply through electrical conductors (not shown). By varying the magnitude of the power supplied to the electromagnetic coils 35, the strength of the magnetic field applied to the MR fluid 33 can be varied. As a result, the resistance to flow or shear of the MR fluid 33, which affects the vibration dampening characteristics of the support member 30, can be varied. The means by which the power supplied to the electromagnetic coils 35 is controlled is described below.

An annular shear plate 40 is provided including an axially extending hollow cylindrical portion 42 and a radially outwardly extending flange portion 44. An inner circumferential surface of the cylindrical portion 42 is secured to an outer circumferential surface of an annular roller bearing 50 by any suitable means. The roller bearing 50 is typically a ball type roller bearing, but may be any suitable anti-friction bearing. One end of the rotatable shaft 11 of the vehicle drive line is received and rotatably supported in the roller bearing 50. The flange portion 44 of the shear plate 40 extends from the cylindrical portion 42, preferably substantially perpendicular to the shaft 11. The flange portion 44 extends through an annular seal 37 mounted on an inner circumferential surface of the support member 30. The seal 37 can be formed as a face seal or any other suitable seal. The flange portion 44 projects through the seal 37 and into the reservoir 31. Thus, the outer periphery of the flange portion 44 is disposed within the MR fluid 33. The dimensions of the reservoir 31 and the flange portion 44 are predetermined so that the flange portion 44 is permitted both axial and radial movement in the reservoir 31 as the shaft 11 is vibrated during operation of the vehicle. In other words, the depth (radial dimension) of the reservoir 31 is greater than the radial length of the flange portion 44 so that the flange portion 44 can move in a radial direction. The width (axial dimension) of the reservoir 31 is greater than the thickness of the flange portion 44 so that the flange portion 44 can move in an axial direction. The flange portion 44 is preferably formed from or coated with a magnetically conductive material, such as a high purity iron. Additionally, the flange 44 may be either solid or perforated.

Figure 3:
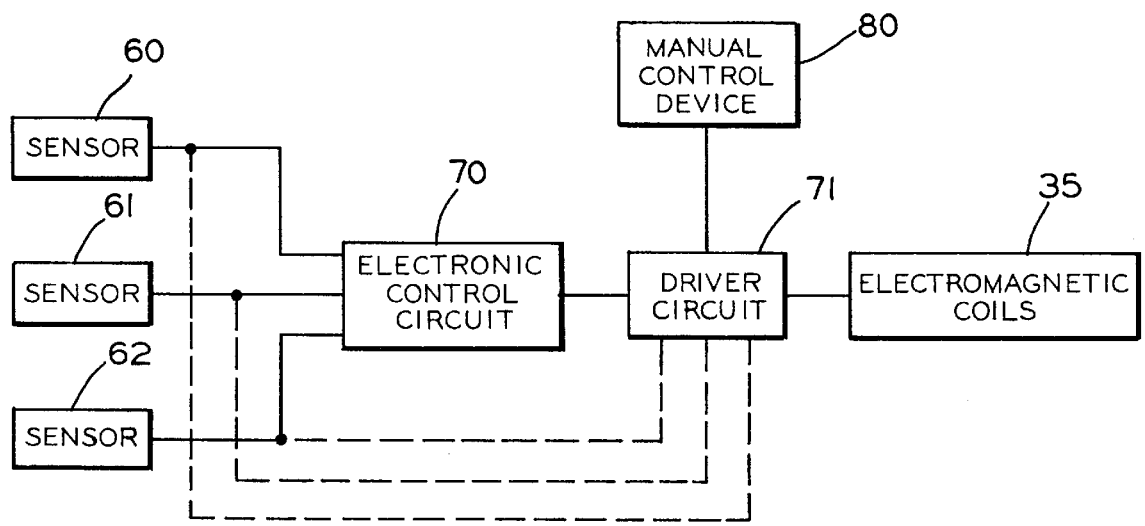
FIG. 3 is a block diagram of a control system for the first embodiment of the center bearing assembly illustrated in FIGS. 1 and 2.

As mentioned above, by varying the magnitude of the power supplied to the electromagnetic coils 35, the vibration dampening characteristics of the fluid 33 can be changed. Such changes are preferably effected in response to a change in one or more of the operating conditions of the vehicle. Sensors are provided for sensing one or more operating conditions of the vehicle. As shown in FIG. 3, a plurality of sensors 60, 61, and 62 can be provided for monitoring the status of the vehicle operating conditions and for generating electrical signals which are representative thereof. For example, some of the vehicle operating conditions which can be monitored by the sensors 60, 61, and 62 can include vehicle speed, vehicle acceleration, rotational speed of the shaft 11, angular displacement of the shaft 11, radial acceleration of the center bearing 50, axial acceleration of the center bearing 50, radial displacement of the center bearing 50, and axial displacement of the center bearing 50. If desired, however, other operating conditions of the vehicle may also be sensed and used to control the vibration dampening characteristics of the support member 30.

Each of the sensors 60, 61, and 62 is connected to an electronic control circuit 70. The electronic control circuit 70, which may be embodied as any conventional microprocessor or similar computing device, is programmed to continuously read the electrical signals from the sensors 60, 61, and 62 and to generate an electrical control signal in response to a pre-programmed algorithm. The algorithm used by the electronic control circuit 70 can be easily derived using known vibration data or by testing on the vehicle. In the simplest embodiment of the invention, a single sensor 60 is used to monitor a single vehicle operating condition. By measuring the amount of vibration which is generated for given value of the sensed operating condition, a look-up table can be created which correlates the value of the sensed operating condition with a value for the control signal which will minimize the generation of such vibration. The same procedure can be followed when two or more operating conditions are sensed.

The output signal of the electronic control circuit 70 is connected to a current driver circuit 71. The current driver circuit 71 is conventional in the art and is provided to convert the output signal from the electronic control circuit 70 into a corresponding electrical current. The electrical current generated by the current driver circuit 71 is fed to the electromagnetic coils 35, which generate the magnetic field in response thereto. Thus, it can be seen that the magnitude of the output signal generated by the electronic control circuit 70 determines the magnitude of the electromagnetic field generated by the electromagnetic coils 35. Consequently, the ability of the MR fluid 33 contained in the reservoir 31 to flow or shear can be varied. The vibration dampening characteristics of the support member 30 can, therefore, be continuously varied according to the control algorithm and the information provided by the sensors 60, 61, and 62.

A manual control device 80 may be directly connected to the driver circuit 71. The manual control device 80 can allow the operator of the vehicle to directly adjust the magnitude of the current supplied to the electromagnetic coils 35. As a result, fine adjustment of the vibration dampening characteristics of the support member 30 is permitted to reduce or eliminate any remaining vibrations transmitted to the vehicle frame. The manual control device 80 can be embodied as a simple potentiometer or other device which, in response to manual manipulation, generates an output signal to the driver circuit 71. The manual control device 80 may be used in conjunction with the sensors 60, 61, and 62 and the electronic control circuit 70, or in lieu thereof.

Additionally, it will be appreciated that the outputs of the sensors 60, 61 and 62 may be connected directly to the driver circuit 71 as shown by the dotted lines in FIG. 3, thereby eliminating the need for the electronic control circuit 70. In this arrangement, the sensors 60, 61, and 62 can function in a manner similar to the manual control device 80 described above, wherein the output signals therefrom are used directly by the driver circuit 71 to control the magnitude of the electrical current supplied to the electromagnetic coils 35.

Figure 4:
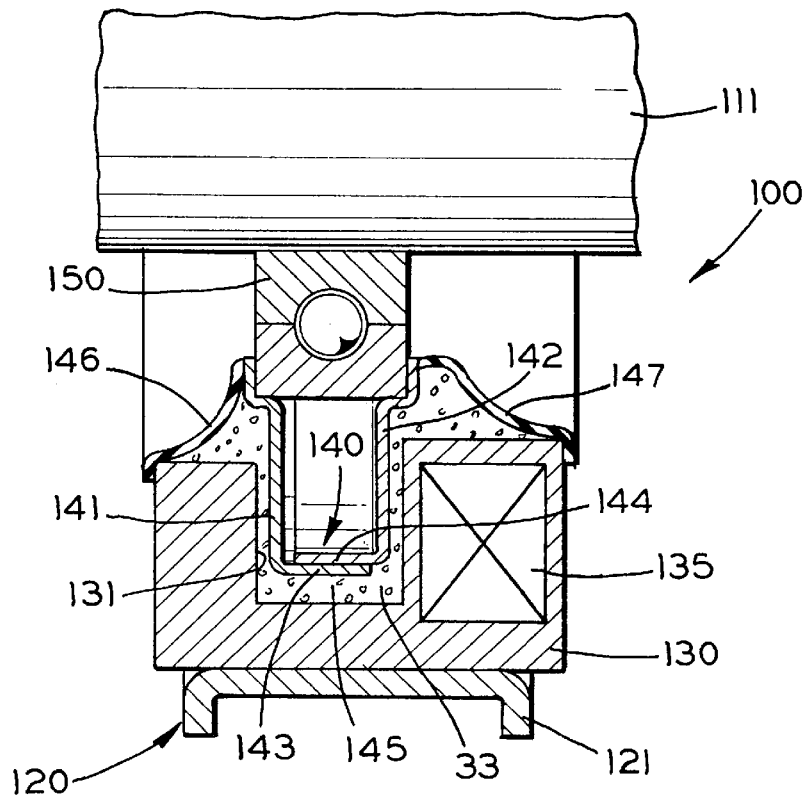
FIG. 4 is a view similar to FIG. 2 illustrating a portion of a second embodiment of a center bearing assembly in accordance with this invention.

A second embodiment of a center bearing assembly according to this invention is indicated generally at 100 in FIG. 4. The center bearing assembly 100 is used in a manner similar to center bearing assembly 10 to rotatably support a shaft 11 of a vehicular drive line. The center bearing assembly 100 includes an annular support member 130. An outer circumferential surface of support member 130 abuts the inner circumferential surface of the body portion 21 of the bracket 20, as described above.

An annular cavity or reservoir 131 is defined within the support member 130. The reservoir 131 is filled with a suitable rheological fluid 33 as described above. One or more coils 135 are provided in the support member 130 proximate the reservoir 131. A two-piece annular shear plate 140 is formed by a first plate member 141 and a second plate member 142. The first plate member 141 is secured to one side of the annular roller bearing 50. The first plate member 141 terminates in a flange portion 143 oriented substantially parallel to a centerline of the rotatable shaft 11. The second plate member 142 is secured to an opposite side of the roller bearing 150 and terminates in a flange portion 144 oriented substantially parallel to the flange portion 143. Furthermore, the flange portion 144 is received along an inner surface of the flange portion 143. As illustrated in FIG. 4, the flange portions 143 and 144 cooperate to form a U-shaped element 145 which, when viewed in cross section, projects into the fluid 133 in the reservoir 131. If desired, the flange portions 143 and 144 can be welded or otherwise secured to form a fluid seal to prevent fluid 133 from reaching an interior volume formed by the U-shaped element 145. A first seal 146, e.g., an elastomeric seal, is provided between the first plate member 141 and the support member 130 to retain the fluid 133 within the reservoir 131. Similarly, a seal 147, e.g., an elastomeric seal, is provided between the second plate member 142 and the support member 130 to retain the fluid 133 within the reservoir 131.

The dimensions of the reservoir 131 and the U-shaped element 145 are predetermined so that the flange portions 143 and 144 are permitted both axial and radial movement in the reservoir 131 as the shaft 111 is vibrated during operation of a vehicle. In other words, the depth (radial dimension) of the reservoir 131 is greater than the radial length of the flange portions 142 so that the flange portion 42 can move in a radial direction. The width (axial dimension) of the reservoir 31 is greater than the thickness of the flange portion 42 so that the flange portion 42 can move in an axial direction.

Figure 5:
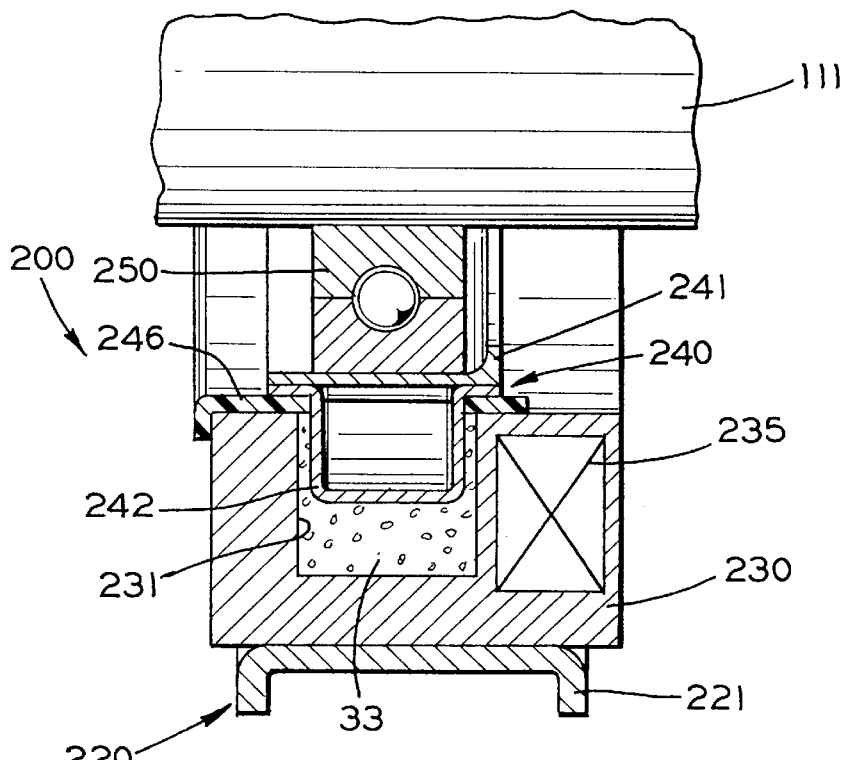
FIG. 5 is a view similar to FIG. 2 illustrating a portion of a third embodiment of a center bearing assembly in accordance with this invention.

A third embodiment of a center bearing assembly is indicated generally at 200 in FIG. 5. An annular support member 230 includes an outer circumferential surface which is secured to an inner circumferential surface of the body portion 21 of the bracket 20 in the manner described above. An annular cavity or reservoir 231 is defined within the support member 230. The reservoir 231 is filled with a suitable rheological fluid 33 described above. One or more coils 235 are provided in the support member 230 proximate the reservoir 231. An annular shear plate 240 is formed by a bracket 241 secured to the annular roller bearing 50 by any suitable means, including splining. The shear plate 240 also includes a circumferential protrusion 242 that is hat-shaped in cross section. The shear plate 240 is connected to the bracket 241. The protrusion 242 extends into the reservoir 231 through a seal 246. Seal 246 can be formed as a face seal, an elastomeric seal, or any other desired seal.

The protrusion 242 of the shear plate 240 is formed so that the width of the reservoir is greater than the width of the protrusion 242. During vibrations caused by operation of a vehicle, the protrusion 242 can movement relative to the reservoir in an axial direction. Thus, axial movement of the shear plate 240 and its attached center bearing 250 is permitted. Alternatively, the protrusion 242 of the shear plate 240 may be axially movable relative to the bracket 241. In this instance, the protrusion 242 moves axially with the support member 230 relative to the stationary bracket 241.

In certain applications, it may be desirable to include a bladder having elastomeric walls suitable for use with a center bearing assembly 10, 100, 200 to simplify sealing of the rheological fluid 33. One type of bladder for use with a center bearing assembly 10, 100, 200 is disclosed in U.S. Pat. No. 5,452,957, assigned to the present assignee, and hereby incorporated by reference.

In accordance with the provisions of the patent statutes, the principle and mode of operation of this invention have been described in its preferred embodiments. However, it should be noted that this invention may be practiced otherwise than as specifically illustrated and described without departing from its spirit or scope.

What is claimed is:

1. A center bearing assembly adapted to rotatably support a rotatable shaft on a vehicle frame comprising:
    a rolling bearing adapted to rotatably support the rotatable shaft;
    a bracket adapted to be secured to a vehicle frame;
    a support member supporting said roller bearing within said bracket, said support member including a reservoir containing a rheological fluid; and
    a shear plate secured to said rolling bearing, said shear plate including a portion extending into said reservoir.

2. The center bearing assembly defined in claim 1 wherein an axial width of said reservoir is greater than an axial thickness of said portion extending into said reservoir.

3. The center bearing assembly defined in claim 1 wherein said shear plate includes a flange portion extending into said reservoir.

4. The center bearing assembly defied in claim 3 wherein said shear plate also includes a cylindrical portion secured to said roller bearing.

5. The center bearing assembly defined in claim 1 including a seal mounted at an opening of said reservoir, said portion of said shear plate extending into the reservoir extending through said seal.

6. The center bearing assembly defined in claim 5 wherein said seal is a face seal.

7. The center bearing assembly defined in claim 5 wherein said seal is an elastomeric seal.

8. The center bearing assembly defined in claim 1 wherein said shear plate is formed by a first plate member having a flange portion and a second plate member having a flange portion.

9. The center bearing assembly defined in claim 8 wherein said flange portions of said first and second plate members extend into said reservoir.

10. The center bearing assembly defined in claim 1 wherein said flange portions of said first and second plate members form a U-shaped element when viewed in cross section.

11. The center bearing assembly defined in claim 1 wherein said shear plate is formed by a bracket secured to said roller bearing and a hat-shaped protrusion extending into said reservoir.

12. The center bearing assembly defined in claim 1 wherein said portion of said shear plate extending into the reservoir also permits radial movement of said shear plate with respect to said support member.

13. The center bearing assembly defined in claim 12 wherein a radial depth of said reservoir is greater than a radial length of said portion extending into said reservoir.

14. A rotatable shaft and center bearing assembly adapted to rotatably mount the shaft to a vehicle frame, comprising:
    a rolling bearing;
    a shaft rotatably mounted within the bearing;
    a bracket adapted to be secured to a vehicle frame;
    a support member supporting said rolling bearing within said bracket, said support member including a reservoir containing a rheological fluid; and
    a shear plate secured to said roller bearing, said shear plate including a portion extending into said reservoir so that axial movement of said shear plate with respect to said support member is permitted.

15. The rotatable shaft and center bearing assembly defined in claim 14 wherein an axial width of said reservoir is greater than an axial width of the portion extending into said reservoir.

16. The rotatable shaft and center bearing assembly defined in claim 14 wherein said portion of said shear plate extending into said reservoir also permits radial movement of said shear plate with respect to said support member.

17. The center bearing assembly defined in claim 16 wherein a radial depth of said reservoir is greater than a radial length of the portion extending into said reservoir.

18. The vehicle defined in claim 16 wherein said portion of said shear plate extending into said reservoir also permits radial movement of said shear plate with respect to said support member.

19. A vehicle comprising:
    a frame;
    a rolling bearing;
    a shaft rotatably mounted within said roller bearing;
    a bracket secured to said frame;
    a support member supporting said roller bearing within said bracket, said support member including a reservoir containing a rheological fluid;
    a shear plate secured to said rolling bearing, said shear plate including a portion extending into said reservoir so that axial movement of said shear plate with respect to said support member is permitted.

* * * * *